United States Patent [19]
Vance, Sr. et al.

[11] Patent Number: 5,327,963
[45] Date of Patent: Jul. 12, 1994

[54] TUBULAR COUPLING DEVICE

[75] Inventors: James C. Vance, Sr., Sedalia; Roy G. Quinlan, Littleton, both of Colo.

[73] Assignee: The Gates Rubber Company, Denver, Colo.

[21] Appl. No.: 784,837

[22] Filed: Oct. 30, 1991

[51] Int. Cl.$^5$ .......................................... E21B 33/127
[52] U.S. Cl. ....................................... 166/187; 277/34
[58] Field of Search .............. 166/187, 179, 203; 277/34, 34.3, 34.6; 285/114, 149

[56] References Cited

U.S. PATENT DOCUMENTS

| | | | |
|---|---|---|---|
| 3,232,640 | 2/1966 | Donkle, Jr. ................. | 285/114 X |
| 3,540,759 | 11/1970 | Schneider .................... | 285/238 |
| 4,310,161 | 1/1982 | Streich ......................... | 277/34 |
| 4,424,861 | 1/1984 | Carter, Jr. et al. ........... | 166/187 X |
| 4,500,095 | 2/1985 | Schisler et al. .............. | 277/34 |
| 4,564,223 | 1/1986 | Burrington ................... | 285/256 |
| 4,569,541 | 2/1986 | Eisenzimmer ................ | 285/149 |
| 4,832,103 | 5/1989 | Slivka et al. ................. | 152/559 |
| 4,941,511 | 7/1990 | Johansen et al. ............ | 166/187 |

Primary Examiner—Terry Lee Melius
Attorney, Agent, or Firm—S. A. Austin; H. W. Oberg; C. H. Castleman

[57] ABSTRACT

A coupling device is adapted for attachment to an elastomeric tubular body having integral, looped reinforcement fibers as part of a tubular assembly. The coupling device includes a coupling member, a stem and a mechanism for retaining the elastomeric tubular body in sealing engagement with the stem when connected therewith. The retaining mechanism maintains this engagement by being interposed within loops of the reinforcement fibers to limit axial movement of the reinforcement fibers relative to the stem. Thus, the grommet retained coupling and the elastomeric tubular body are maintained in spaced relation to and sealing engagement with each other.

18 Claims, 5 Drawing Sheets

FIG. 3
FIG. 4
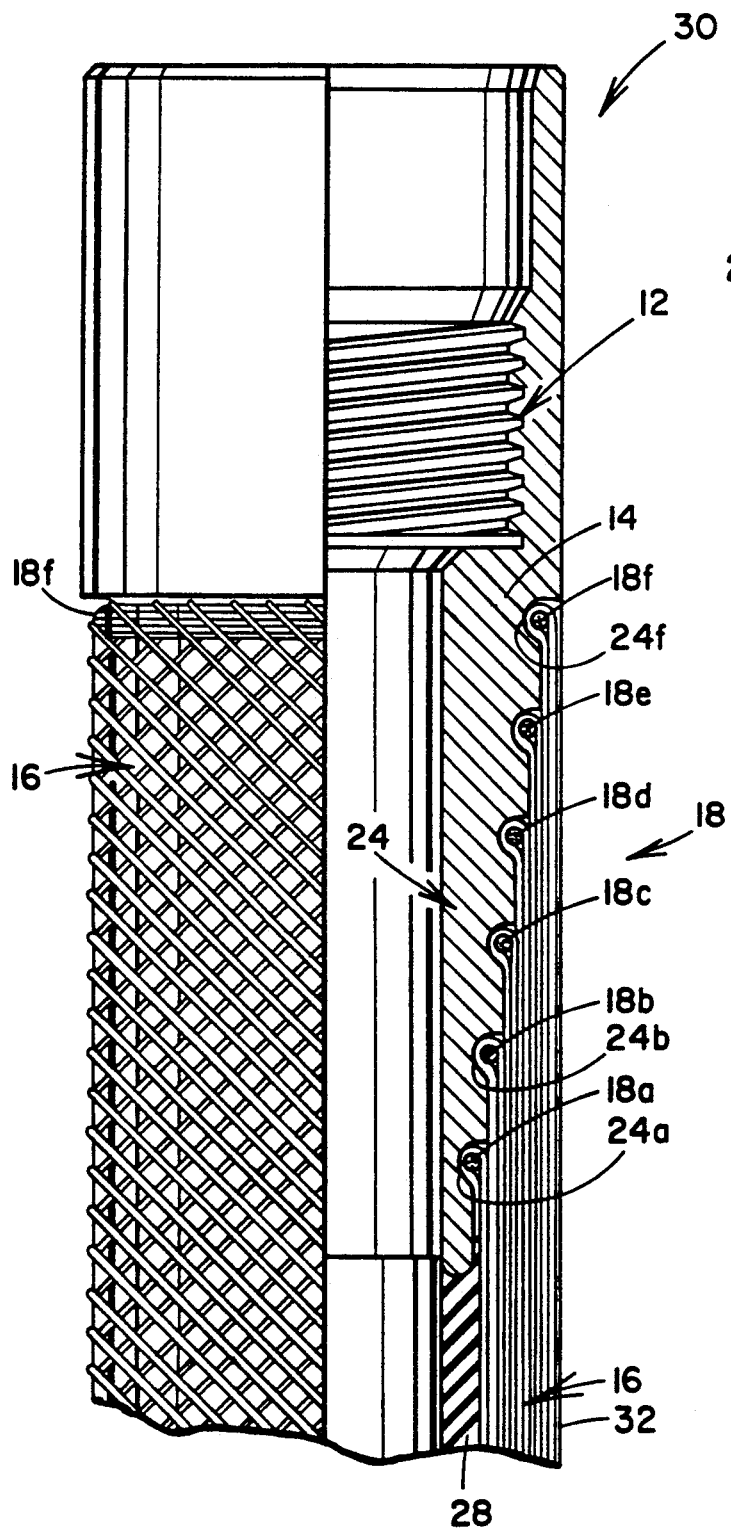
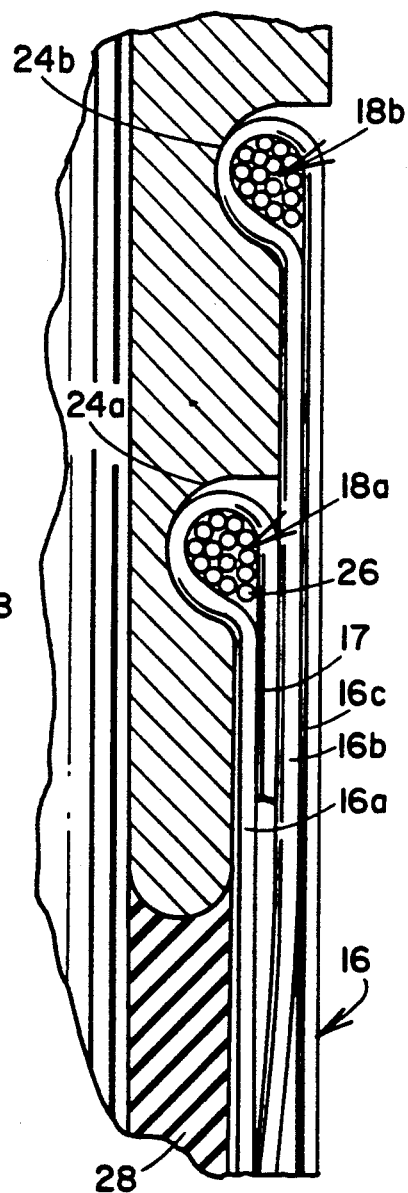

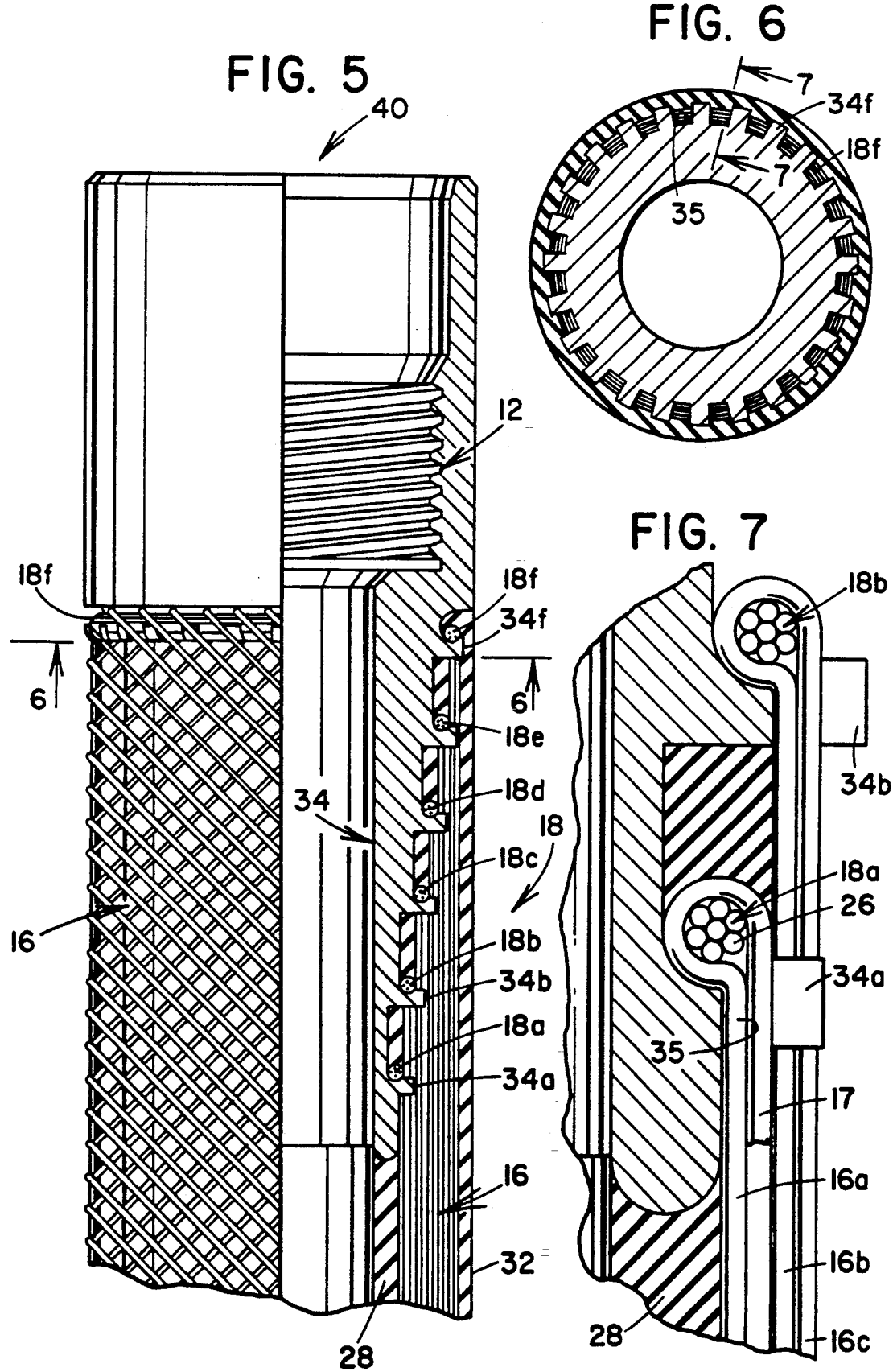

FIG. 8
FIG. 9
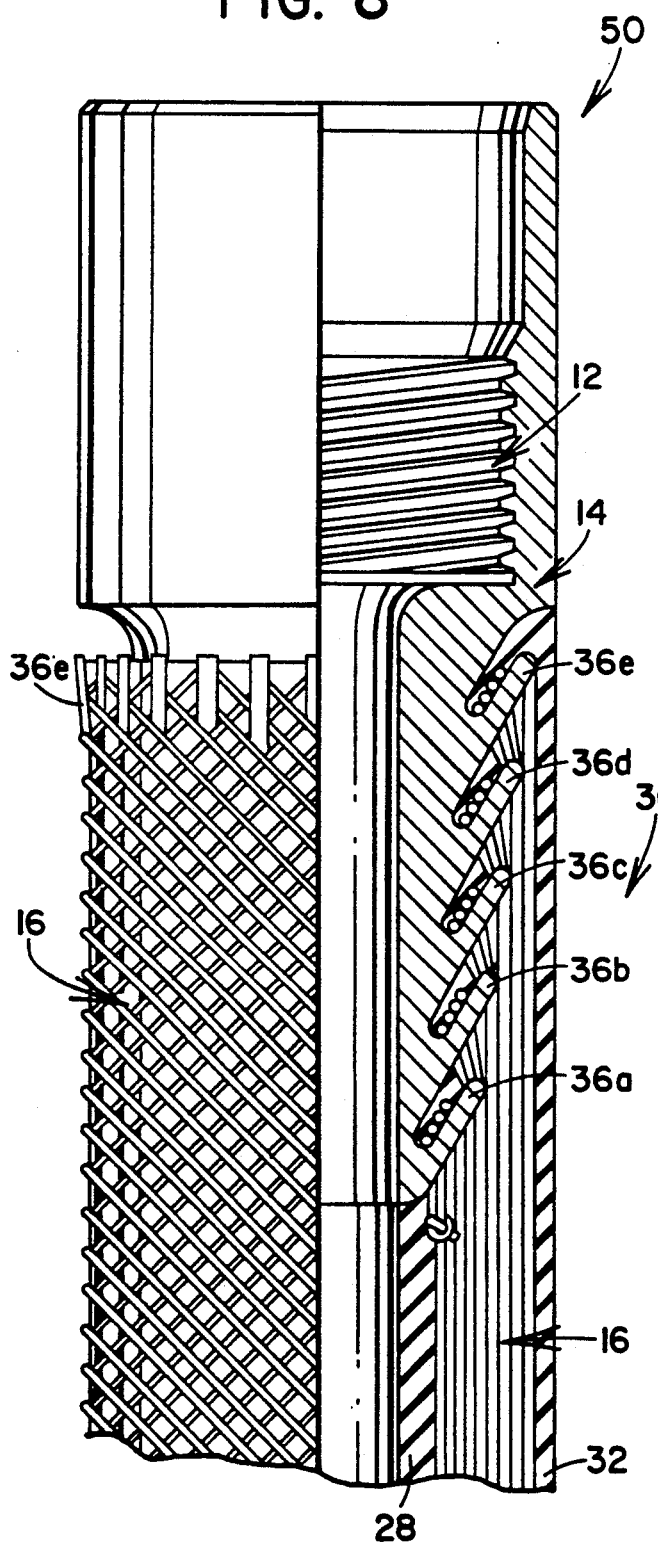
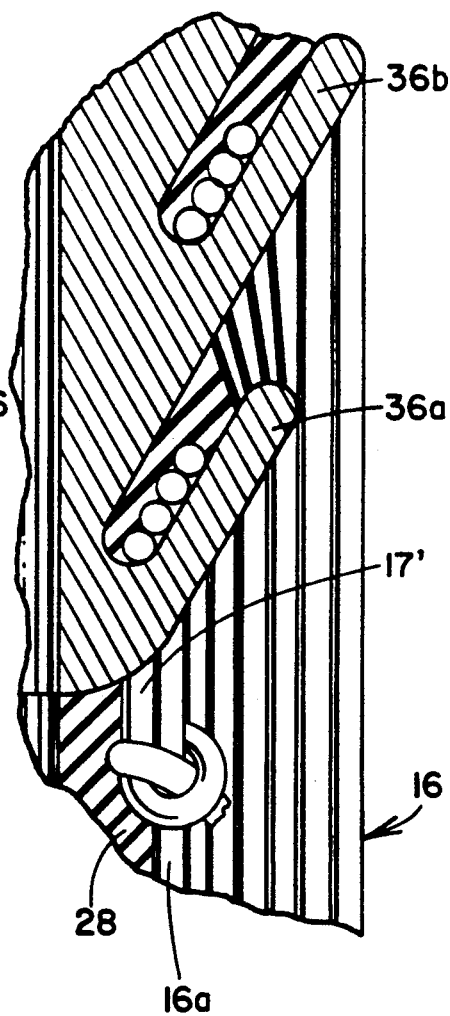

TUBULAR COUPLING DEVICE

BACKGROUND OF THE INVENTION

1. Field of the Invention

This invention relates generally to the joining of rigid couplings to elastomeric tubular structures for use with inflatable packers and fiber reinforced elastomeric hose or tubing and, more particularly, to couplings designed to interact with fiber reinforcements to become integral members of inflatable packer, hose and tubing assemblies. More specifically, the invention relates to improved coupling designs connecting with enhanced load capability for these assemblies to other such assemblies or other structures with which these assemblies communicate.

2. Description of the Prior Art

An inflatable packer is a down-hole tool which is inflatable with fluid or some other mechanism to seal off an annular space in a well bore. Inflatable packers generally include a tubular elastomeric structure or bladder that is inflated to expand and engage the inner surface of a well bore. A coupling is typically provided on at least one end of the bladder to connect the packer to a mandrel, other packers, or to a well string. Because inflatable packers operate under great pressure, both from the well environment and from the internal pressure necessary to inflate the elastomeric tubular structure to seal the well bore, the elastomeric tubular structure must preferably be reinforced. One such form of reinforcement includes the use of integral fibers, and the attachment of such a fiber reinforced structure to the coupling must be very strong. Integral fibers include, but are not limited to, random fiber impregnations, strands, and cords.

Some hose and tubing assemblies are likewise operated under great external and internal loads and pressures. These hose and tubing assemblies generally include an elastomeric tubular structure reinforced with integral fibers, and a coupling on at least one end to connect the assemblies to other hose or tubing assemblies and other structures with which the assemblies are adapted to function.

The prior art approaches for joining couplings to the fiber reinforced tubular structures of inflatable packer, hose and tubing assemblies, have included use of epoxies or numerous variations of applying a clamping pressure across the inner and outer surfaces of the tubular structures, or directly to the integral reinforcing fibers within the structures.

In order for inflatable packer, hose, and tubing assemblies to function properly, the junction of the couplings and tubular elastomeric structures must effectively seal. Prior art inflatable packer, hose, and tubing assemblies have upper pressure and load limits, above which the junction of the coupling and elastomeric tubular structure tends to fail. This is because the retentive force which the coupling can exert at the junction is exceeded, at which the junction loses its seal, and the elastomeric tubular structure separates from the coupling. The retentive force which the coupling can exert, where clamping is used, is limited to the friction generated across the surfaces of abutting tubular structures or the surfaces of the reinforcing fibers, as appropriate.

Consequently, there is still a need for a coupling design or structure which provides high retentive force and can withstand high pressures and internal loads without rupture of its seal or separation from the coupling.

SUMMARY OF THE INVENTION

Accordingly, the subject invention has as an object the provision of a coupling construction applicable to inflatable packer, hose, and tubing assemblies which increases the upper pressure and load limits above which the junction of the coupling and elastomeric tubular structures fail.

Another object of the present invention is to provide an improved coupling device for attachment to reinforcing fibers for reinforced elastomeric tubular structures.

To achieve the foregoing and other objects and in accordance with a purpose of the present invention, as embodied and broadly described herein, a coupling device is disclosed. The coupling device is adapted for attachment to an elastomeric tubular body having integral looped reinforcement fibers, as part of a tubular assembly. The device includes a coupling member, a stem, and a mechanism for retaining the elastomeric tubular body in sealing engagement with the stem when connected therewith. The retaining mechanism maintains this engagement by being interposed within loops of the reinforcement fibers to limit axial movement of the reinforcement fibers and the elastomeric tubular body relative to said stem.

BRIEF DESCRIPTION OF THE DRAWINGS

The accompanying drawings, which are incorporated in and form a part of the specification and in which like numerals designate like parts, illustrate preferred embodiments of the present invention and together with the description, serve to explain the principles of the invention. In the drawings:

FIG. 3 is an enlarged, partial schematic view of the embodiment of FIG. 1 particularly illustrating the grommet retained coupling construction of the invention;

FIG. 4 is an even more enlarged, cut-away view of the embodiment of FIG. 3 showing in greater detail the mechanism that retains the fiber reinforcements in spaced relation to the coupling;

FIG. 5 is a view similar to that of FIG. 3 but depicting another preferred embodiment of the invention;

FIG. 6 is a sectional view taken substantially along line 6—6 of FIG. 5;

FIG. 7 is a view similar to that of FIG. 4 but related to the embodiment depicted in FIG. 5;

FIG. 8 is a view similar to that of FIG. 3 but depicting yet another preferred embodiment of the invention; and FIG. 9 is a view similar to that of FIG. 4 but related to the embodiment of FIG. 8.

DETAILED DESCRIPTION OF THE PREFERRED EMBODIMENTS

Figure 1:
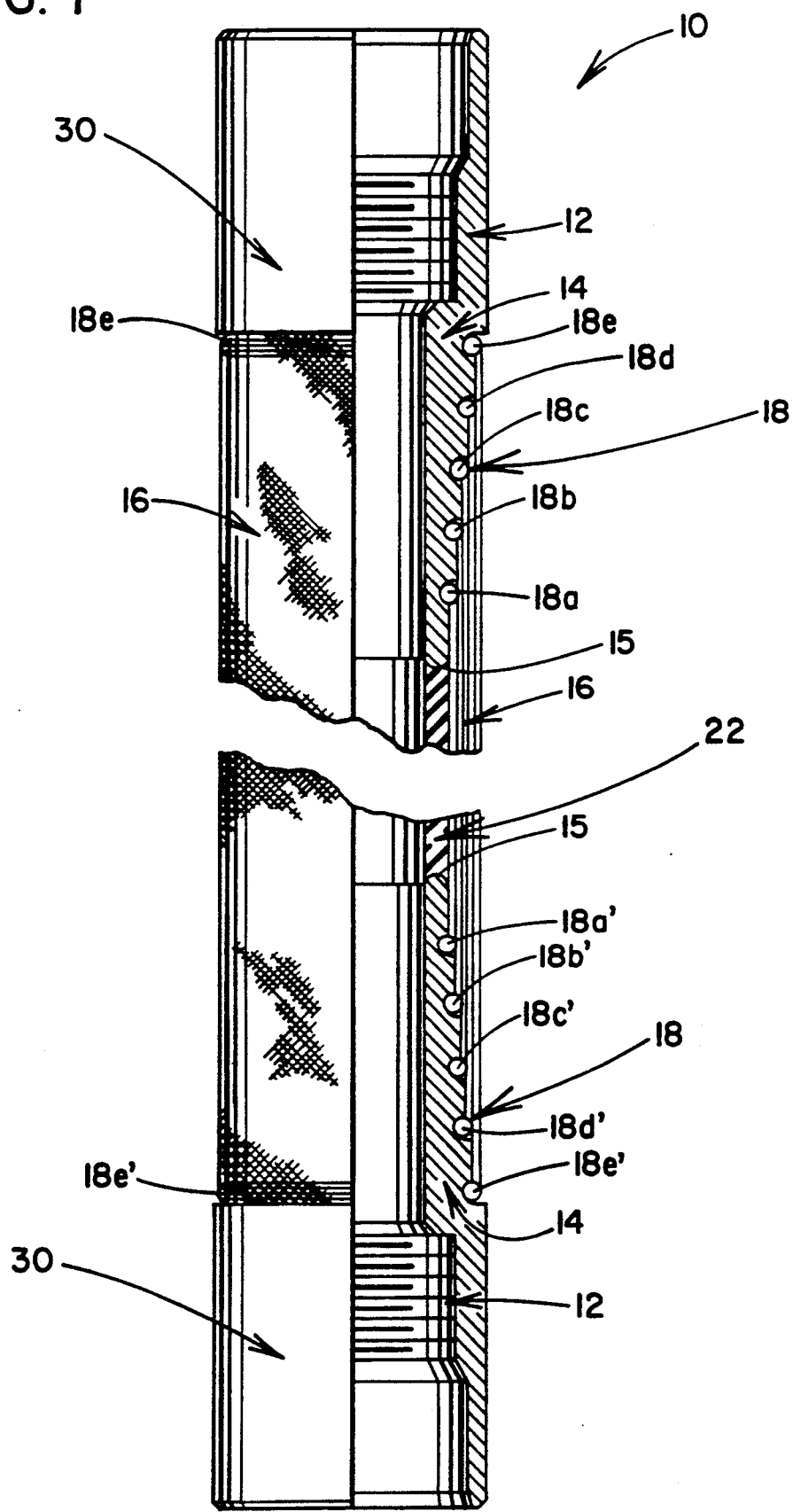
FIG. 1 is a vertical schematic, with some parts cut away, of one embodiment of an inflatable packer constructed in accordance with the present invention and exposing the outermost reinforcing fiber ply as well as the interior of the packer.

Referring to the drawings in particular FIG. 1 there is shown an inflatable packer assembly 10 including a grommet retained coupling 30 having a coupling member 12, a stem 14, reinforcement fibers 16, and a retaining mechanism preferably in the form of grommets 18. In this preferred embodiment, the coupling members 12 include female threads for joining with male counterparts. However, any comparable means of connecting the structures with which an inflatable packer might be connected (e.g. male threads, clamps, bayonet fittings, etc.) is contemplated. Moreover, the couplings members 12 on each end are not necessarily identical in connection arrangement.

An elastomeric tubular body or elastomeric bladder 22 extends between coupling members 12 and radially about stem 14. Integral to this bladder 22 are multiple plies of reinforcing fibers 16 that run continuously between the grommets 18. The first ply of the reinforcement fibers 16 runs from grommet 18a to grommet 18a' in a spiral fashion. Fibers 16 then loop about this second grommet 18a' and proceed to grommet 18b to form the second ply. The second ply is preferably spiralled in a lay opposite that of the first ply. The reinforcement fibers 16 proceed in opposite lay spirals, looping about each succeeding grommet (18b', 18c, 18c', 18d, 18d', 18e and 18e') to form each succeeding ply until all grommets 18 have been looped about.

In operation, the elastomeric bladder 22 is pressurized by fluid placed within to inflate the bladder 22, thereby causing it to expand circumferentially along the portion of its length that resides between the stem ends 15. The inflatable packer 10 includes various details and elements related to effecting inflation that are not critical to the invention and therefore will not be detailed herein. Such details are known in the art of inflatable packers, and examples thereof can be found in U.S. Pat. No. 4,614,346, the contents of which are specifically incorporated herein by reference.

Figure 2:
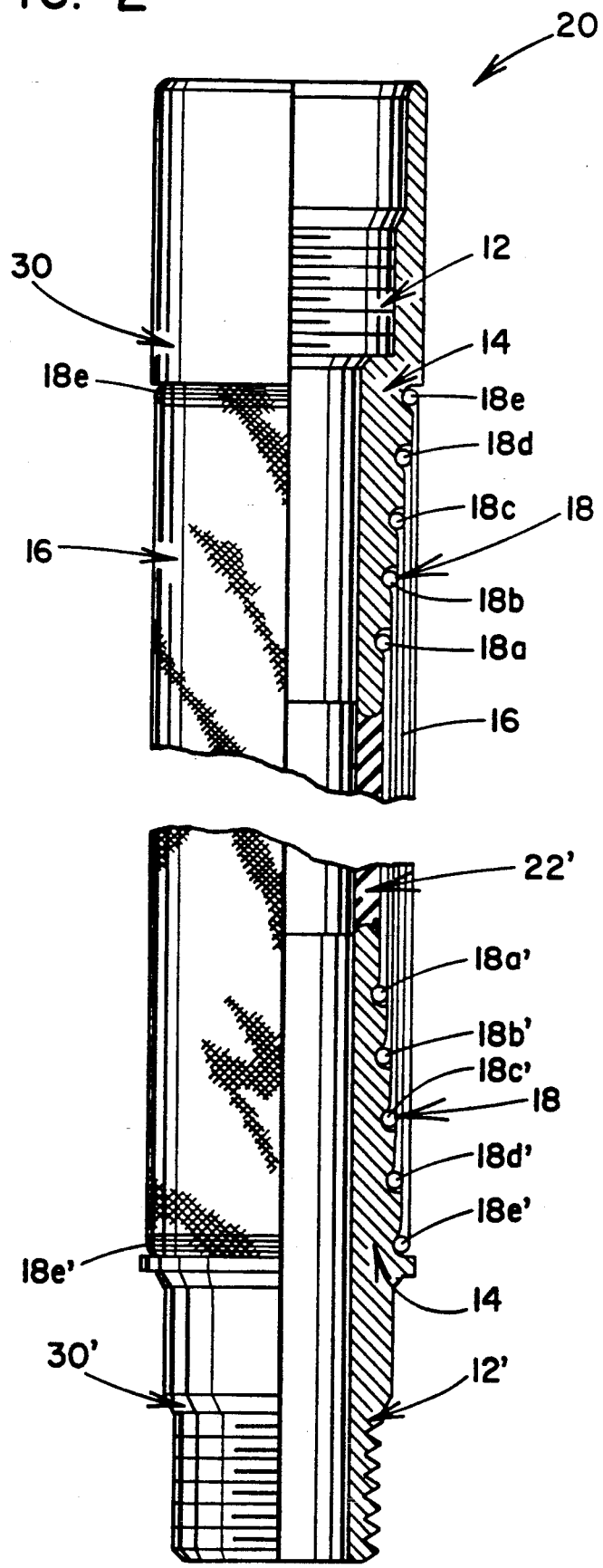
FIG. 2 is a vertical schematic similar to that of FIG. 1 but illustrating one embodiment of a hose or tubing assembly utilizing integral fiber reinforcement and constructed in accordance with the present invention.

FIG. 2 depicts an elastomeric hose or tubing assembly 20. This assembly 20 has essentially the same elements, critical to the invention, as the inflatable packer 10 of FIG. 1. Coupling members 12 of the grommet retained coupling 30 and 12' of the grommet retained coupling 30' are shown with female threads at 12 and male threads at 12'. As with packer 10, the coupling members 12 and 12' can take any form that effects connection to structures to such assemblies 20 are to be connected. This assembly 20 also includes stems 14, reinforcement fibers 16, and grommets 18.

The portion that extends between and radially about the stems 14 is the elastomeric tubular structure 22'. The reinforcement fibers 16 are looped about the grommets 18 and layered in plies spiraling alternately between the grommets 18 in the same fashion as with the elastomeric bladder 22 of the inflatable packer 10 of FIG. 1. The elastomeric bladder 22 and elastomeric tubular structure 22' are herein referred to generically as elastomeric tubular bodies.

For both the inflatable packer 10 and the elastomeric hose assembly 20, it is contemplated that geometries other than the referenced spiral may be used in forming the plies of reinforcement fibers 16. These include various wraps and braids. Moreover, in both applications of this preferred embodiment the reinforcement fibers 16 may be selected from any appropriate material such as metal, synthetic textiles, natural textiles, or any material capable of being formed into strands.

Unlike the elastomeric bladder 22 of the inflatable packer 10, the elastomeric tubular structure 22' of the assembly 20 does not normally expand appreciably while in operation. Instead, the geometry of the reinforcement fibers 16 and the materials of the elastomeric tubular structure 22' are chosen to form the structure 22' to withstand expected internal pressure without appreciable expansion. The fundamentals for choosing such geometries and materials are well known in the art of elastomeric hose and tubing.

For greater detail of the relationships of the stem 14, the reinforcement fibers 16 and grommets 18, FIGS. 3 and 4 are now referenced. These figures depict the same embodiment of the invention as do FIGS. 1 and 2, but in greater detail. The grommet retained coupling 30 is shown in FIG. 3. In this preferred embodiment, the reinforcement fibers 16 of first ply 16a are distributed relatively evenly about the annular depression 24a with beginning ends 17 laid across the depression 24a. The grommet 18a, consisting of multiple turns of strand 26, is wound about the ply 16a to cause a portion of the ply 16a to be received within the depression 24a. Beginning ends 16aa are then looped over the grommet 18a, and the ply 16a is spiralled to a like grommet 18 over the elastomeric tube 28 to another coupling 30 or to other similar fixture.

The second ply 16b then returns to the grommet 18b, layered upon and spiralled in the opposite hand to the first ply 16a. At this point, the second ply 16b loops about the grommet 18b and proceeds as the third ply 16c in the same manner and the same direction of spiral as the first ply 16a. However, the third ply 16c is spiralled about second ply 16b. This process continues until all annular depressions 24 have received reinforcement fibers 16. When the last of the annular depressions 24f has received the fibers 16 by the last grommet 18f, the fibers 16 are looped about the grommet 18f and terminated in the same manner as was done about the first grommet 18a. This reception process within the depressions 24 by the grommets 18 retains the reinforcement fibers 16 in spaced relation with the stem 14, particularly axially. Since the fibers 16 are integrally wound about the elastomeric tubular bodies 22 or 22', as appropriate, and the stem 14 is integral to couplings 30 or 30', as appropriate, the couplings 30 or 30' and the elastomeric tubular bodies 22 or 22' are thus retained in space relation with each other, particularly axially.

The number of plies of reinforcement fibers 16 and associated grommets 18 is chosen according to the load to which the assemblies 10 or 20 are expected to be subjected. The greater the expected load, the greater the number of plies. The minimum number of plies of reinforcement fibers 16 is one.

As can readily be seen, this method of laying up plies of reinforcement fibers 16 and the resultant structure provides the opportunity for an approximately equal load to be shared by all the fibers 16 throughout their length made up of multiple plies. As mentioned earlier, geometries of the fibers 16 other than spiraling are contemplated for use with the present invention, without losing the benefit of uniform loading of the fibers 16.

After the fibers 16 are laid up in plies in the aforementioned manner, an elastomer 32 impregnates and covers fibers 16.

FIGS. 5 through 7 depict another preferred embodiment of the invention. All aspects of the reinforcement fibers 16, the grommets 18, the elastomeric tube 28, and the elastomer 32, of grommet retained coupling 40 are the same as in the previously described embodiment. The only significant difference lies in the substitution of the segmented annular ridges 34 with fibers 16 passing through spaces 35 between ridges 34 for the annular depressions 24. In the previous described embodiment, depressions 24 receive portions of reinforcement fibers 16 by the action of winding the grommets 18 in place and thereby retaining the stem 14 and fibers 16 in spaced relation. In this embodiment, segmented annular ridges 34 are utilized to act directly upon the grommets 18 which in turn act upon the reinforcement fibers 16 to retain the fibers 16 in spaced relation to the stem 14. As in the previous embodiment, this results in coupling 40 being retained in spaced relation with elastomeric tubular bodies 22 or 22'.

The grommets 18 of both of the two previously mentioned preferred embodiments preferably comprise at least one turn of at least one strand 26. It is also preferred that the hoop strength of a grommet 18 be at least 40 percent of the combined tension expected to be applied to the reinforcement fibers 16 of the ply associated with a given grommet 18. Hoop strength is defined as the tensile strength of an individual strand 26, times the number of strands 26, times the number of turns of the strands 26 in a grommet 18. Once a material is chosen for the strand 26, the number of turns is selected to meet the necessary hoop strength. It is more preferred that grommets 18 comprise 5 to 500 turns of a strand with a hoop strength of at least 50 percent of the combined tension expected to be applied to the reinforcement fibers 16 of the ply associated with a given grommet 18. It is most preferred that the grommets 18 comprise 10 to 200 turns of one strand with a hoop strength of at least 50 percent of the combined tension expected to be applied to the reinforcement fibers 16 of the ply associated with the given grommet 18.

Strand 26 may be made of any appropriate material such as metal fibers, any synthetic or natural textile fibers, or any material adapted to be formed into strands.

In FIGS. 8 and 9, a coupling 50 illustrates yet another preferred embodiment of the invention. All aspects of the reinforcement fibers 16, the elastomeric tube 28, and the elastomer 32 are the same as the first previously described embodiments. The significant difference in this embodiment lies in the substitution of fingers or hooks 36 in place of grommets 18 and annular depressions 24 or segmented annular ridges 34. FIG. 9 shows a greater detail of the relationships of fingers 36 and fibers 16. In this preferred embodiment, the reinforcement fibers 16 are looped about the fingers 36 in the same manner as they loop about the grommets 18 of the first preferred embodiment of FIGS. 1-4. However, beginning ends 17' of fiber 16 that loop about the first row of fingers 36a must be tied off to fibers 16 in a double half hitch or other knotted manner, to avoid slippage from about fingers 36a. Also, the opposite ends of fibers 16 that loop about the last row of fingers 36e must likewise be tied off.

The final result, as in the two previously described preferred embodiments, is that the fibers 16 are maintained in spaced relationship with the stem 14. This in turn enables grommet retained coupling 50 to be maintained in spaced relationship with the elastomeric tubular bodies 22 or 22' particularly axially This invention and the described embodiments thereof provide, as a primary benefit, a coupling construction applicable to inflatable packers, hose, and tubing assemblies which increases the upper pressure and load limits above which the coupling and elastomeric tubular body separate.

The foregoing description and the illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. A coupling device adapted for attachment to an elastomeric tubular body having integral looped reinforcement fibers as part of a tubular assembly, said device comprising:
   a coupling member;
   a stem connected to said coupling member;
   said stem having at least one annular depression disposed thereabout for receiving a portion of said reinforcement fiber loops within; and
   ring means for constrictively retaining said reinforcement fiber loops within said annular depression and said elastomeric tubular body in sealing engagement with said stem, when connected therewith, by interposition within loops of said looped reinforcement fibers to limit axial movement of said reinforcement fibers and said elastomeric tubular body relative to said stem.

2. The device of claim 1, wherein said ring means further comprises at least one strand circumferentially disposed at least once about said annular depression and adapted to be radially interposed within a portion of said reinforcement fiber loop.

3. The device of claim 2, wherein said ring means comprises at least one strand circumferentially disposed a plurality of times about said depression and adapted to be radially interposed within said portion of said reinforcement fiber loops.

4. The device of claim 3, wherein said strand comprises metal.

5. The device of claim 3, wherein said strand comprises a fabric fiber.

6. A coupling device adapted for attachment to an elastomeric tubular body having integral looped reinforcement fibers as part of a tubular assembly, said device comprising:
   a coupling member;
   a stem connected to said coupling member; and
   a plurality of hooks disposed about said stem for interposition within said reinforcement fiber loops to limit axial movement of said reinforcement fibers and said elastomeric tubular body relative to said stem.

7. In an inflatable packer of the type having an elastomeric bladder with integral reinforcing fibers, and coupling means adjoining said elastomeric bladder for attaching said inflatable packer to a well string and the like, said coupling means having a coupling member, a stem, and means for retaining said elastomeric bladder in secure, sealed position with said stem, the improvement wherein said reinforcing fibers are looped, and said retaining means being said stem having at least one annular depression disposed thereabout for receiving a portion of said reinforcement fiber loops within, and ring means for constrictively retaining said reinforcement fiber loops within said annular depression interposed within the loops of said reinforcing fibers to limit the axial movement of said integral reinforcement fibers and said elastomeric bladder relative to said stem.

8. The improvement of claim 7, wherein said ring means further comprises at least one strand circumferentially disposed at least once about said annular depression with a portion of said reinforcement fiber loop radially interposed in between.

9. The improvement of claim 8, wherein said ring means comprises at least one strand circumferentially disposed a plurality of times about said depression with said portion of said reinforcement fiber loops radially interposed in between.

10. The improvement of claim 9, wherein said strand comprises metal.

11. The improvement of claim 9, wherein said strand comprises a fabric fiber.

12. In an inflatable packer of the type having an elastomeric bladder with integral reinforcing fibers, and coupling means adjoining said elastomeric bladder for attaching said inflatable packer to a well string and the like, said coupling means having a coupling member, a stem, and means for retaining said elastomeric bladder in secure, sealed position with said stem, the improvement wherein said reinforcing fibers are looped, and said retaining means being a plurality of hooks disposed about said stem and interposed within the loops of said reinforcing fibers to limit the axial movement of said integral reinforcement fibers and said elastomeric bladder relative to said stem.

13. In an elastomeric hose assembly of the type having an elastomeric tubular structure with integral reinforcing fibers, and coupling means adjoining said elastomeric tubular structure for attaching said hose assembly to other hose assemblies and structures, said coupling means having a coupling member, a stem, and means for retaining said elastomeric tubular structure in adjoined, sealed position with said stem, the improvement wherein said reinforcing fibers are looped, and said retaining means being said stem having at least one annular depression disposed thereabout for receiving a portion of said reinforcement fiber loops within, and ring means for constrictively retaining said reinforcement fiber loops within said annular depression interposed within the loops of said integral reinforcing fibers to limit the axial movement of said integral reinforcement fibers and said elastomeric tubular structure relative to said stem.

14. The improvement of claim 13, wherein said ring means further comprises at least one strand circumferentially disposed at least once about said annular depression with a portion of said reinforcement fiber loop radially interposed in between.

15. The improvement of claim 14, wherein said ring means comprises at least one strand circumferentially disposed a plurality of times about said annular depression with said portion of said reinforcement fiber loops radially interposed in between.

16. The improvement of claim 15, wherein said strand comprises metal.

17. The improvement of claim 15, wherein said strand comprises a fabric fiber.

18. In an elastomeric hose assembly of the type having an elastomeric tubular structure with integral reinforcing fibers, and coupling means adjoining said elastomeric tubular structure for attaching said hose assembly to other hose assemblies and structures, said coupling means having a coupling member, a stem, and means for retaining said elastomeric tubular structure in adjoined, sealed position with said stem, the improvement wherein said reinforcing fibers are looped, and said retaining means being a plurality of hooks disposed about said stem and interposed within the loops of said integral reinforcing fibers to limit the axial movement of said integral reinforcement fibers and said elastomeric tubular structure relative to said stem.

* * * * *